(No Model.)  7 Sheets—Sheet 4.
D. F. LEISHMAN.
CORN-HARVESTER.
No. 603,608.  Patented May 3, 1898.
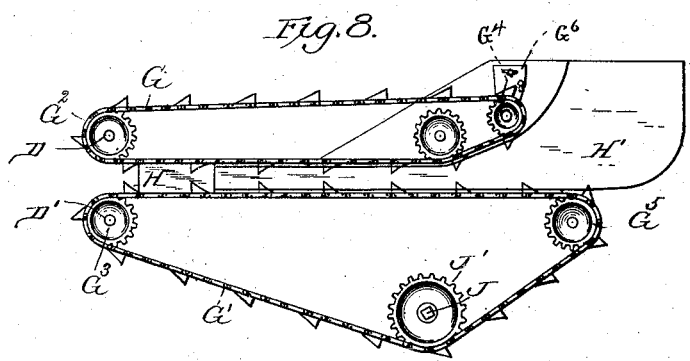
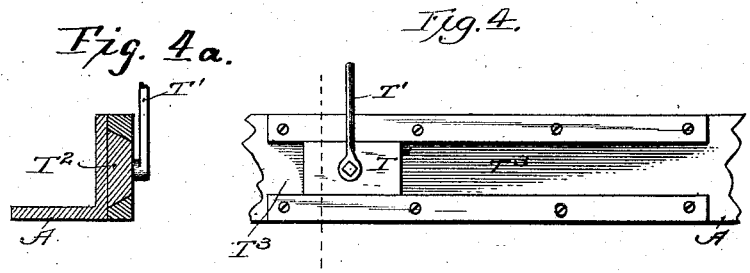
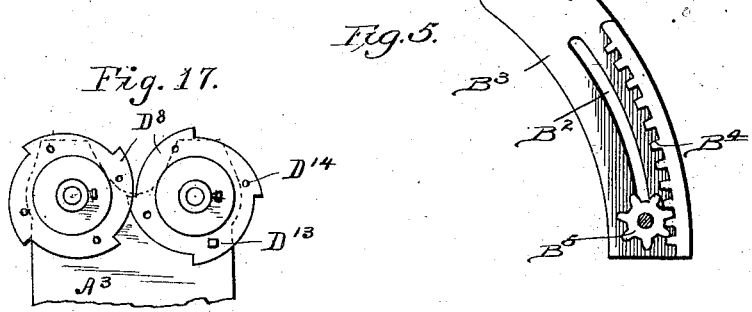
WITNESSES:
INVENTOR
David F. Leishman
BY
Niles & Greene,
ATTORNEYS.

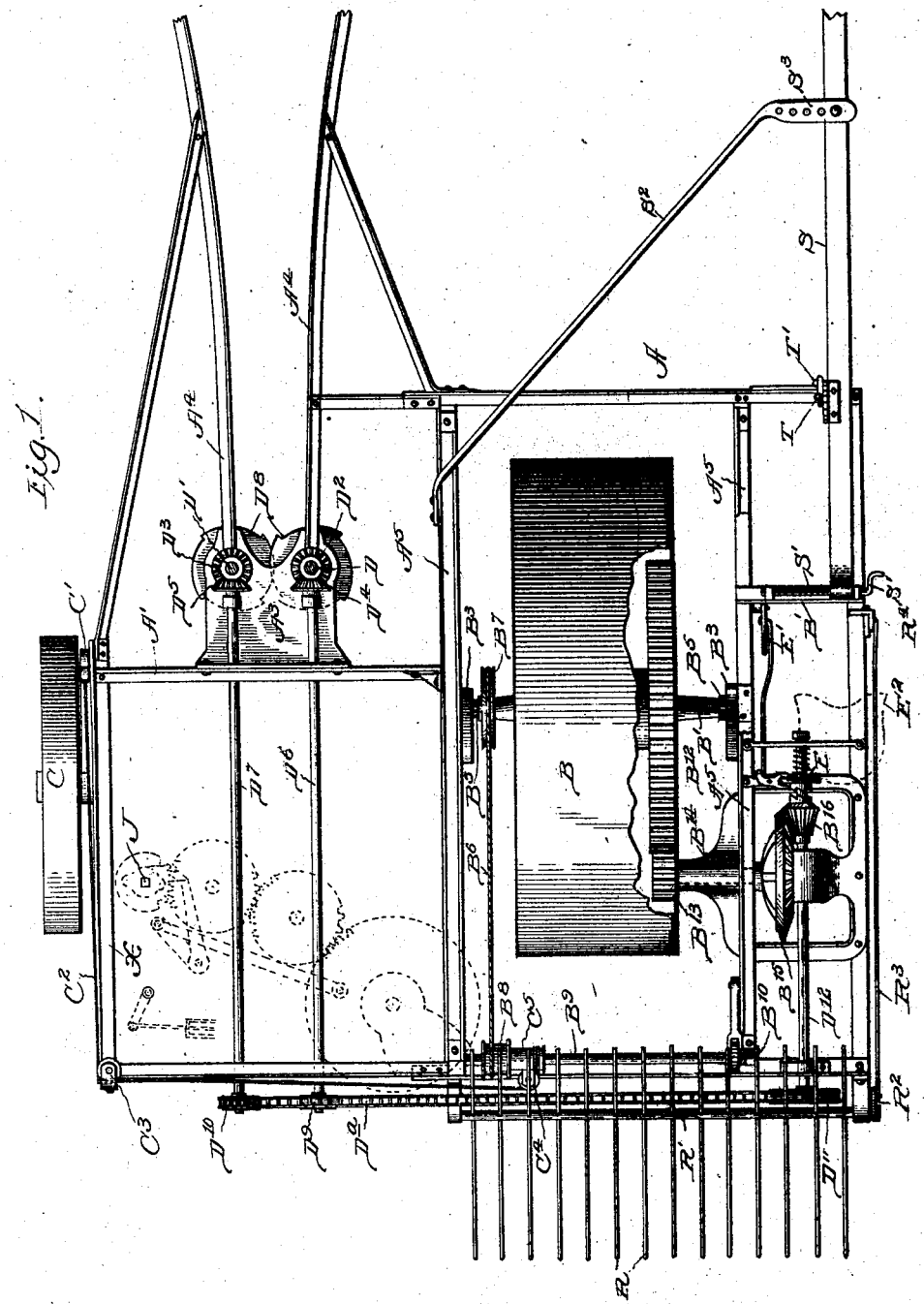

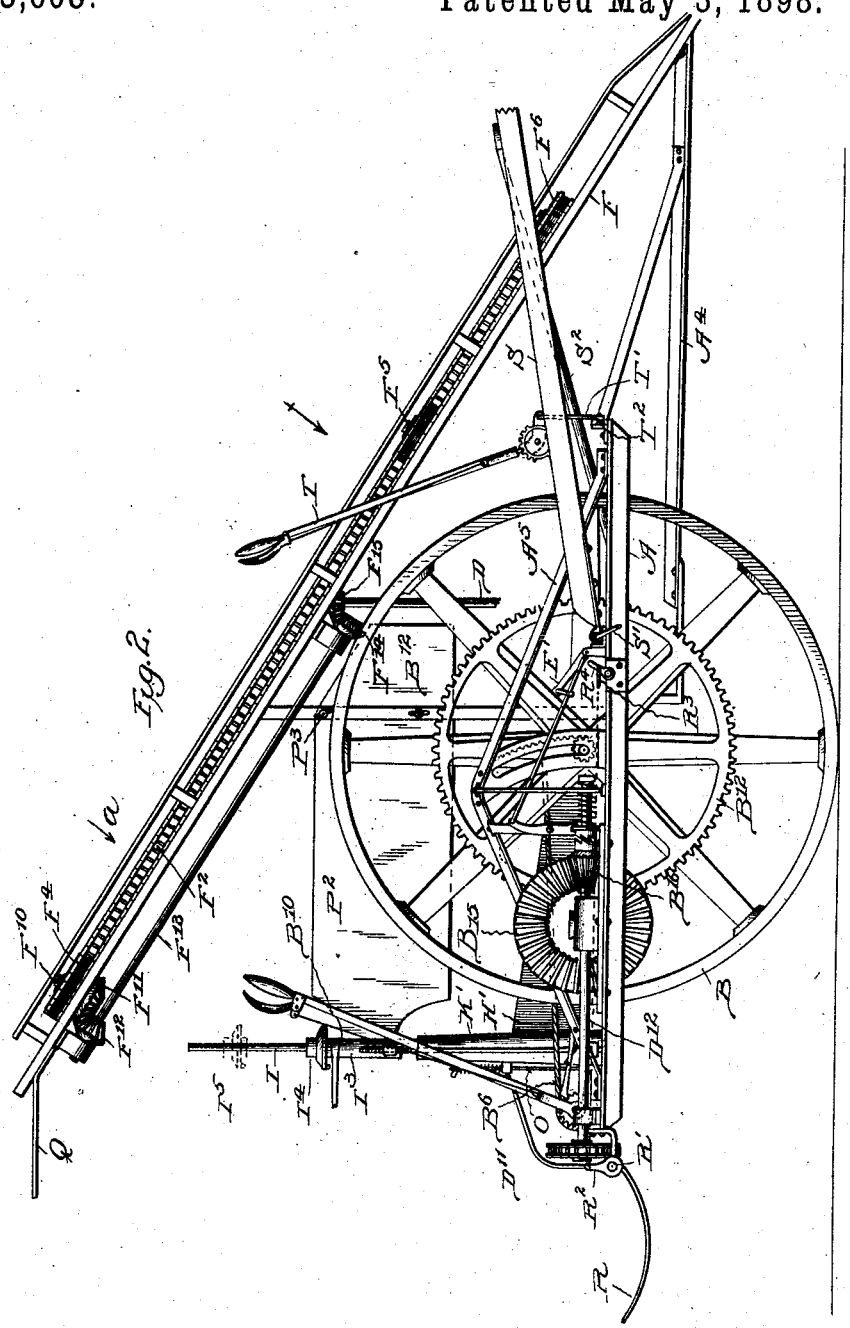

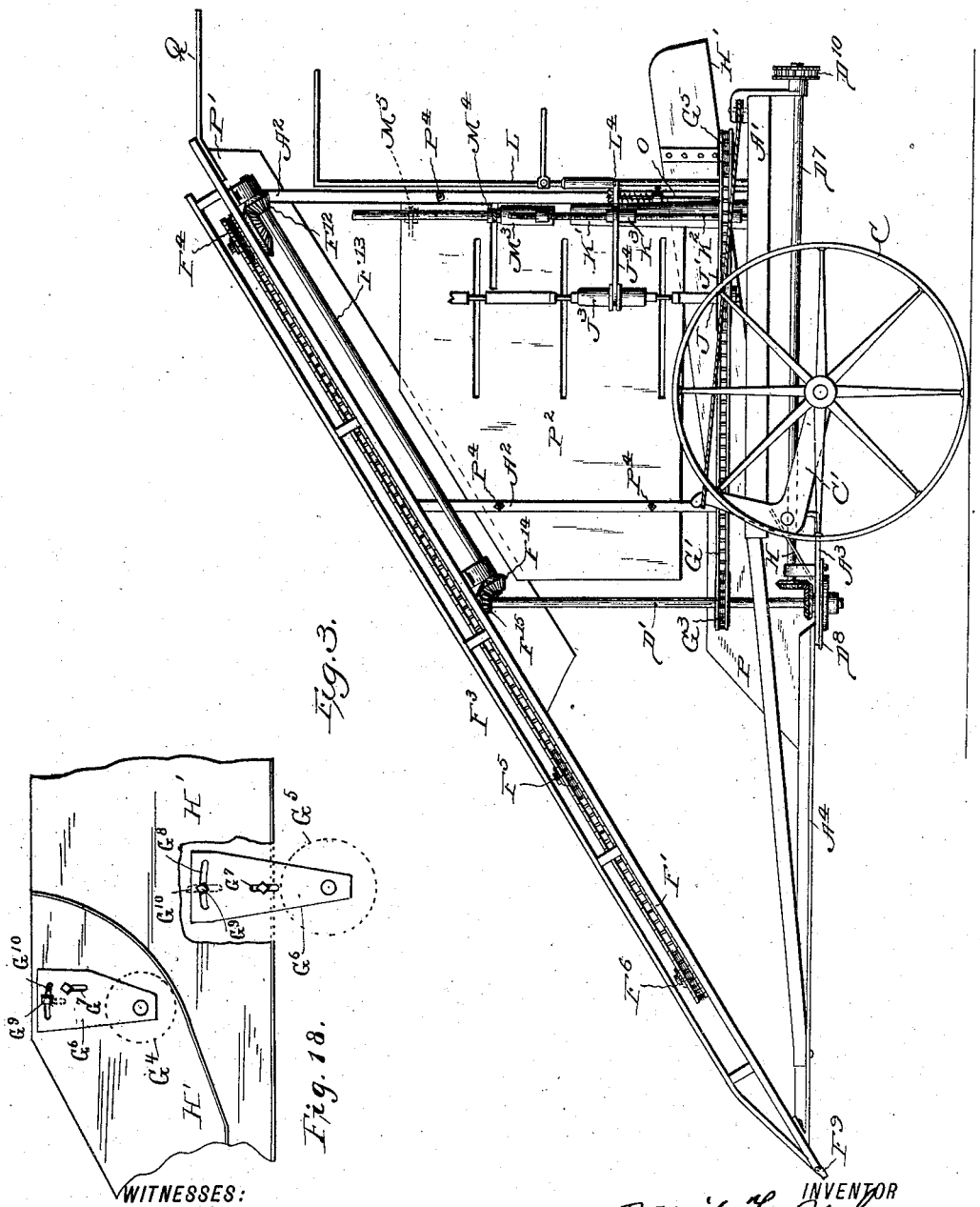

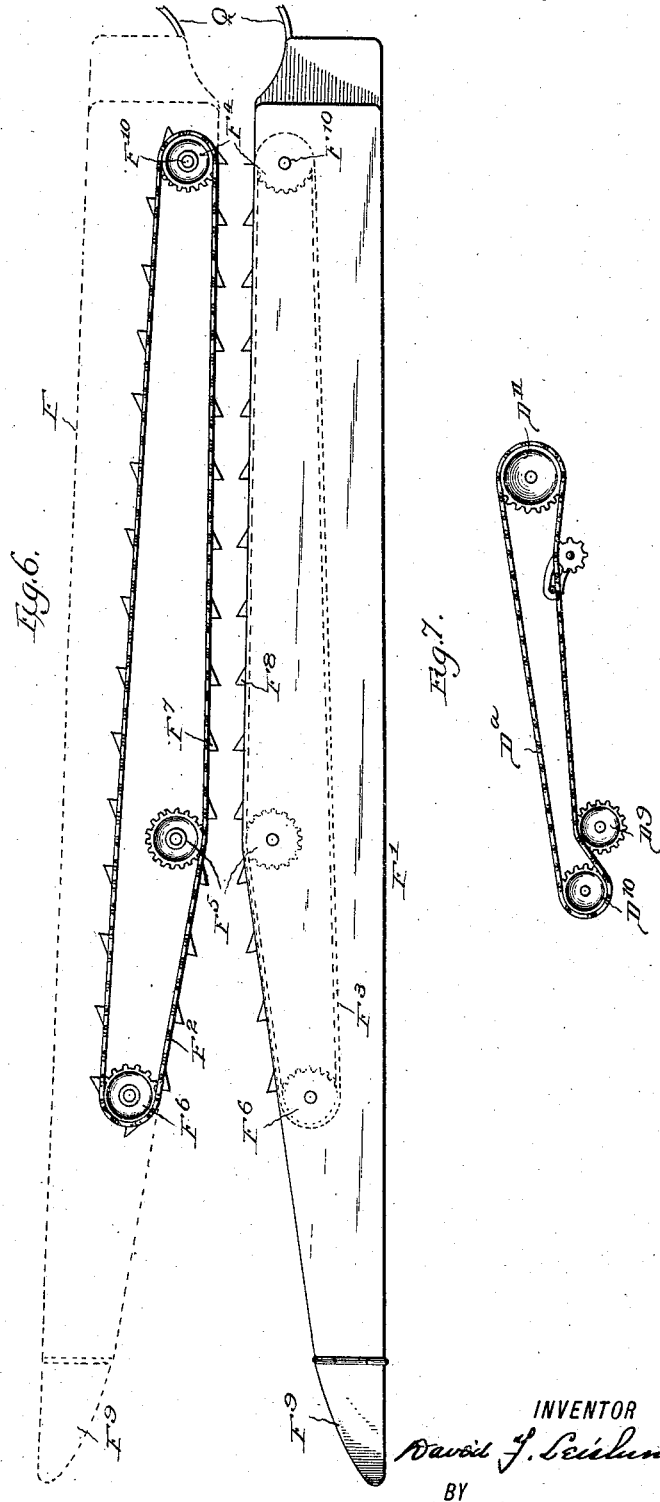

(No Model.) 7 Sheets—Sheet 6.

D. F. LEISHMAN.
CORN HARVESTER.

No. 603,608. Patented May 3, 1898.

WITNESSES:
Harry T. Rohrer
Denis J. Downing

INVENTOR
David F. Leishman
BY
Niles & Greene
ATTORNEYS.

(No Model.) 7 Sheets—Sheet 7.
D. F. LEISHMAN.
CORN HARVESTER.
No. 603,608. Patented May 3, 1898.
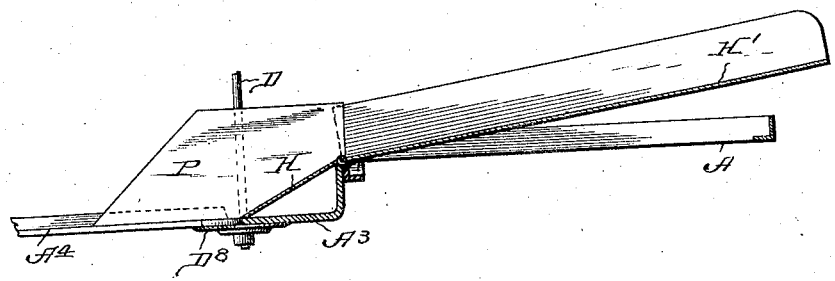
Fig. 13.
Fig. 14.
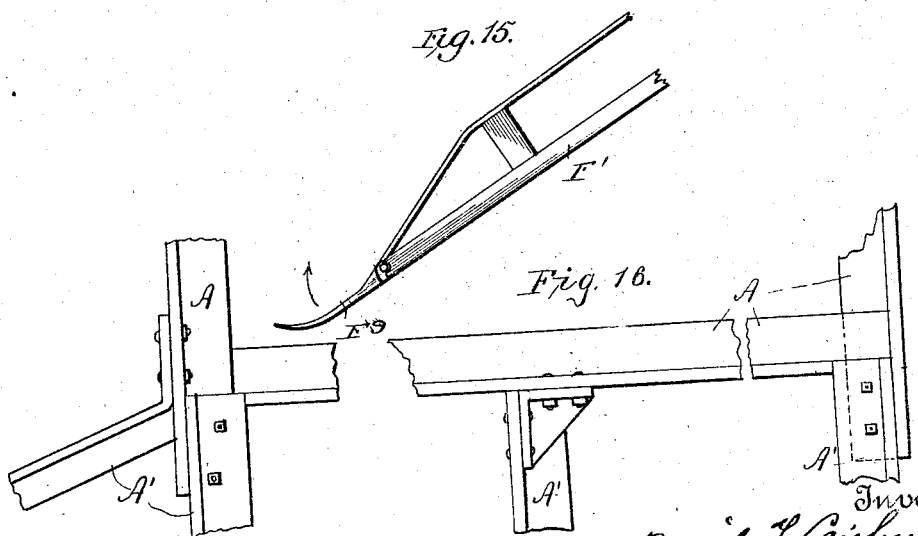
Fig. 15.
Fig. 16.
Witnesses
Harry S. Rohm
Denis J. Downing
Inventor
David F. Leishman
by Niles & Greene
Attorneys.

UNITED STATES PATENT OFFICE.

DAVID F. LEISHMAN, OF WHITEWATER, WISCONSIN, ASSIGNOR TO ADOLPHUS STRASSMAN, OF SAME PLACE, LEDYARD V. LEWIS, OF SUN PRAIRIE, WISCONSIN, AND STEPHEN S. ALLEN, OF ROCKTON, ILLINOIS.

CORN-HARVESTER.

SPECIFICATION forming part of Letters Patent No. 603,608, dated May 3, 1898.

Application filed January 25, 1898. Serial No. 576,874. (No model.)

*To all whom it may concern:*

Be it known that I, DAVID F. LEISHMAN, a citizen of the United States, residing at Whitewater, in the county of Walworth and State of Wisconsin, have invented certain new and useful Improvements in Corn-Harvesters; and I do hereby declare the following to be a full, clear, and exact description of the invention, such as will enable others skilled in the art to which it appertains to make and use the same.

This invention relates to corn-harvesters adapted to cut one row at a time, first gathering or bringing to an upright position such stalks as may be straggling or inclined, to carry the severed stalks rearward along an inclined platform, to pack them, to compress them into bundles, to apply one or more bands while the stalks are still erect, and to deliver the bundles thus bound at one side of the row just cut, where they are out of the path taken in cutting the next row.

The general object of the machine is to produce a comparatively simple compact machine that shall be the same success in the corn-field that other machines are in cutting small grains and grass. With this general object in view various novel devices and expedients are employed. The working parts are principally borne by a frame supported at an adjustable height upon two wheels, one of which serves to actuate the various mechanisms.

The invention is illustrated in the accompanying drawings, in which—

Figure 10:
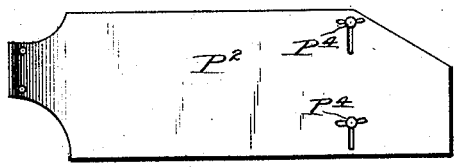
Figure 11:
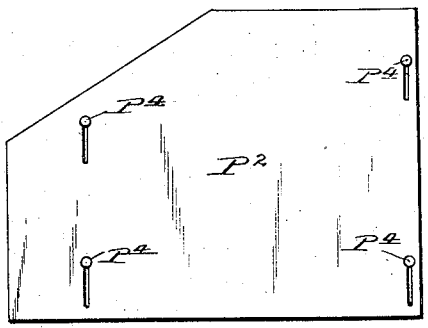
Figure 9:
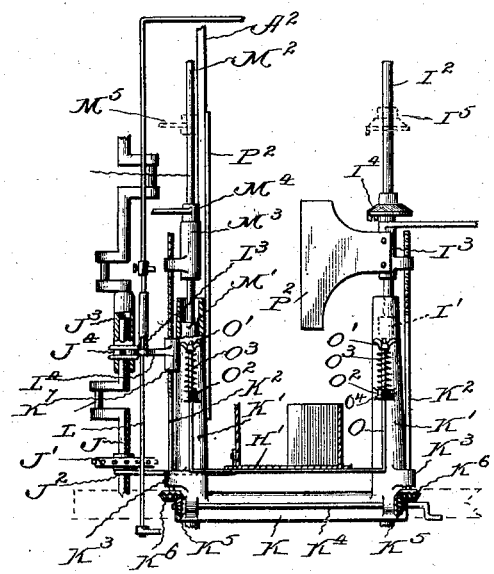
Figure 12:
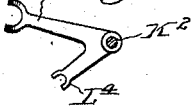

Figure 1 is a plan of the machine with the gathering, conveying, packing, and binding devices omitted. Fig. 2 is a side elevation of the right side of the machine. Fig. 3 is a like view of the left side. Figs. 4 and 4ª are details of the tongue connection. Fig. 5 illustrates the connection between the main wheel-axle and the frame. Fig. 6 shows the gathering devices, looking in the direction of the arrow in Fig. 2. Fig. 7 shows the rear driving-chain. Fig. 8 shows in plan the lower conveying-chains and the binding-platform. Fig. 9 is a rear view showing the manner of supporting the free rear end of the binding-platform and the means for extending the shafts of the binding devices. Figs. 10 and 11 are side elevations of vertical walls alongside the front-to-rear passage for the severed stalks. Fig. 12 is a plan view of arms for extending the compressor and packer shafts. Fig. 13 is a section parallel to the tongue, showing a hinged platform and certain adjacent parts. Fig. 14 is a front view of the frame member supporting the forward end of the hinged platform. Fig. 15 is a side elevation of the front end of one of the gathering devices. Fig. 16 illustrates the connection between the main and supplementary frames. Fig. 17 is a bottom view showing the attachment of the knives. Fig. 18 shows in detail the means for adjusting the position of certain sprocket-wheels.

In the drawings, A represents a rigid horizontal frame, and A' a supplementary frame rigidly, but detachably, secured to the frame A and lying for the most part in the same plane. For conveniently connecting the frames the transverse members of the main frame, or angle irons rigidly fixed thereto, are allowed to project a considerable distance toward the grain side of the machine, and the transverse members of the supplemental frame are so placed as to lie alongside such projections. Bolts are then passed through the several overlapping parts, as shown in Fig. 16, to detachably unite the two frames into one whole. From the frame A' rise perpendicular members A², for supporting devices to be described, and from the front of the same frame a rigid forked plate A³ passes first downward from the frame and then forward to support certain cutting devices. To the forks of this plate are rigidly fixed forwardly-projecting members A⁴, which support and form part of certain gathering devices. The compound frame A A' is supported by a drive-wheel B near the free side of the frame A and a smaller wheel C at the opposite side of the frame A'. The drive-wheel rotates on its shaft B', and the latter itself rotates, but only in adjusting the vertical height of the frame. In such adjustment the shaft ends rise and fall relatively in curved slots B² in vertical plates B³, fixed at their lower ends to the frame A and at their upper ends to trusses $A^5$, rigidly fixed to the frame and suitably braced laterally. The plates are provided with rack-teeth $B^4$, which are engaged by pinions $B^5$, fixed to the shaft. In raising the frame the shaft is forced to rotate by a cable $B^6$, passing around and attached to a pulley $B^7$, and since the shaft cannot descend the rotation of the gear in the proper direction raises the rack and of course the frame to which it is attached. From the pulley the cable passes over a drum $B^8$ upon a shaft $B^9$, which is rotated, step by step, at will by means of a hand-lever $B^{10}$ and the ordinary pawl-and-ratchet mechanism. The other supporting-wheel C rotates upon a gudgeon borne by one arm of a bell-crank lever $C'$, centrally pivoted to an attachment of the frame $A'$, and to the other arm of the lever is attached a cable $C^2$, which passes around pulleys $C^3$ $C^4$, and thence around a drum $C^5$ upon the shaft $B^9$ above mentioned. The parts are so proportioned that the rotation of this latter shaft raises the two sides of the frame equally.

The plate $A^3$ supports two vertical shafts D $D'$, which project downward through the plate and bear just above the plate-gears $D^2$ $D^3$, which mesh with gears $D^4$ $D^5$ upon horizontal shafts $D^6$ $D^7$, running back to the rear of the frame $A'$. One of the vertical shafts bears just below the plate $A^3$ a knife $D^8$, having several nearly plane spiral cutting-segments. Over the corresponding part of the other shaft is slipped a like knife free from the shaft but secured to the plate by a bolt $D^{13}$, Fig. 17, in such position that one of its cutting-segments coacts with the like segments of the other rotary knife, and when one segment of the fixed knife becomes dull it is readjusted to bring a fresh segment into position, the bolt $D^{13}$ being withdrawn and reinserted after the knife has been turned to bring another hole $D^{14}$ in the knife to register with the bolt-hole in the plate. As the knives are similar, either may be fixed while the other rotates, or both may rotate. The horizontal shafts are driven in opposite directions by a chain belt $D^a$, passing over sprocket-wheels $D^9$ $D^{10}$ upon the shafts, and is itself driven by a sprocket-wheel $D^{11}$, Fig. 7, upon a shaft $D^{12}$. The latter is driven from the main drive-wheel through a gear $B^{12}$, fixed to the drive-wheel, a pinion $B^{13}$, shaft $B^{14}$, gear $B^{15}$, and pinion $B^{16}$ upon the shaft $D^{12}$. The pinion $B^{16}$ is at will thrown out of engagement with its shaft by means of a spring-clutch E, operated by a lever $E'$ within convenient reach of a seat $E^2$, usually occupied by the driver.

Secured to the front ends of the members $A^4$, respectively, are upwardly and rearwardly inclined members F $F'$, whose rear ends are supported by the members $A^2$, rising from the frame $A'$. These members carry suitable bearings, respectively, for the upper ends of the shafts D $D'$, and they consist of two plates or boards, between which endless sprocket-chains $F^2$ $F^3$ run upon sprocket-wheels $F^4$ $F^5$ $F^6$, so placed that the inner folds of the chains follow, substantially, the marginal lines of the boards, those lines being convergent for some distance from the lower front ends of the boards and then parallel to the upper rear ends. The chains are provided with arms $F^7$ $F^8$, which project beyond the margins of the boards and serve to carry the stalks rearward. At their lower front ends the boards are provided with metal tips $F^9$, hinged to swing upward but not downward and adapted to run along the surface of the ground and slide beneath fallen stalks. The rear sprocket-wheels $F^4$ drive the chains and are driven by means of a shaft $F^{10}$, gears $F^{11}$ $F^{12}$, shaft $F^{13}$, and gear $F^{14}$, engaging a gear $F^{15}$ upon the upper end of one of the shafts D $D'$. The lower portions of the stalks severed by the knives are at once engaged by the arms of another similar pair of sprocket-chains G $G'$, arranged in a horizontal plane, with their inner folds substantially in the same vertical plane and below the corresponding members of the inclined chains already described, and driven, respectively, by sprocket-wheels $G^2$ $G^3$ upon the shafts D $D'$, a short distance above the cutting devices.

As the severed ends of the stalks pass rearward from the knives they slide up along an inclined plate H to the top of the front member of the frame $A'$ and then along a slightly-inclined binding-platform $H'$, hinged at its front end to swing vertically and provided with low vertical side walls slotted to allow the chain-arms to project into the space between them. The guiding sprocket-wheels of these chains are supported from this platform, and the rear ones $G^4$ $G^5$ are made adjustable in their own planes, so that the tension and position of the chains may be regulated. Such adjustment is illustrated in Fig. 18, where each sprocket is shown as mounted on an arm or plate $G^6$, having a central slot $G^7$, through which passes a pivotal bolt securing the arm to the bottom plate of the way or hinged platform. The end of the arm opposite the sprocket-wheel has a transverse curved slot $G^8$, through which passes a bolt $G^9$. This bolt extends through the platform in a slot $G^{10}$, substantially at right angles with the general direction of the front to rear way for the stalks. If both the bolts be loosened, the sprocket-wheels may be pushed toward or away from the stalkway or may swing upon the central bolts to vary the tension of the chains.

Upon the right side of the binder-platform and near its rear end is a knotter and ejector shaft I, and upon the left are a packer-shaft J, a needle-shaft $M'$ $M^2$, and a compressor-shaft L. The packer-shaft is square, and upon it slides, without rotation distinct from that of the shaft, a sprocket-wheel $J'$, which is supported upon the shaft by an arm $J^2$ from the swinging platform and which drives, by well-known gearing and other devices, all the shafts just mentioned, the latter having the usual relative location and operating, in the usual manner, packing, compressing, and binding devices without novelty. In machines of this class, however, it is very desirable to be able to bind at different heights, since corn varies in height between very wide limits, and it is also desirable to apply more than one band to the shocks of the larger kinds of corn, especially where, as in certain soils, there is an extraordinary length of stalk. For these reasons I provide for automatic or predetermined adjustment of the binding table or platform, while the binding devices remain at a fixed height, for varying the height of the binding, and for using upon the shafts two or more needles with two or more corresponding knotters, &c.

Beneath the binding-platform, but above the usual gearing connecting the packer-shaft and the knotter-shaft, is a casting K, supported from the frame and having vertical tubular arms K', in which lie, respectively, the needle-shaft and the knotter-shaft. Each of these shafts has a lower tubular portion M' I', in which slides without rotation an upper part $M^2 I^2$, which rotates in a suitable bearing $M^3 I^3$, but cannot slide therein. These bearings are supported from the arms K' by shafts $K^2$, whose threaded upper ends work in lugs upon the bearings and whose lower portions rotate without longitudinal motion in projections $K^3$ from the arms K'. The two shafts are forced to rotate simultaneously by means of a crank-operated shaft $K^4$, mounted upon the casting K and provided with gears $K^5$, engaging gears $K^6$ upon the lower end of the shafts $K^2$. It is evident that by rotation of the crank-operated shaft the needle and knotter shafts will be lengthened or shortened equally, and the needle or needles and knotter or knotters will thus be caused to apply the binding-cord at a greater or less distance from the lower ends of the stalks.

The rear free end of the swinging binder-platform is supported in a stirrup O, consisting of a rod threaded at its ends and bent to U shape and provided with wing-nuts O' upon its ends. The side members of the stirrup slide freely in lugs $O^2$ upon the arms K' of the casting K, and the whole is supported by springs $O^3$, coiled about the members between the lugs and the wing-nuts. The platform is thus supported by the elastic force of the springs and its height thus automatically varies with the weight resting upon it. Now since there is always a certain correspondence between the weight and height of the corn the machine automatically binds each bundle at a height dependent upon the length of the stalks. If, however, in any case it should be desired to bind at a fixed height, the platform may be fixed at the desired point by means of set-screws $O^4$, working in the lugs and engaging the side members of the stirrup.

Upon the needle-shaft at $M^4$ is placed an ordinary needle, and upon the knotter-shaft at $I^4$ is arranged the usual coacting knotter. Both shafts extend upward from these points, and another needle and knotter may be located at $M^5 I^5$, respectively.

When the needle and knotter shafts are extended in the manner set forth, it is desirable that the packer and the compressor and trip shafts should both be also extended. With this object both are made telescopic, as shown at $J^3 L^3$, and the upper portion of each is engaged by an arm $J^4 L^4$ from a sleeve $K^7$, working upon the threaded middle portion of the nearest shaft $K^2$. By this means these shafts also are varied in length simultaneously with the needle and knotter shafts.

The gearing and other devices near the knives are protected by thin shields P, corresponding to and at their rear ends loosely overlapping the side walls of the binder-platform. Analogous shields P' depend from the inclined gathering and conveying devices directly above, and the intermediate space is sufficiently protected by vertical walls $P^2$, slotted in the usual manner for the passage of the needles, packers, &c., and also adjustably fixed to their supports, as shown at $P^3 P^4$, so that they may be raised or lowered bodily whenever the members that work through their slots are raised or lowered. The gathering devices, platform-walls, shields, and intermediate walls form the walls of a passage-way extending entirely through the machine from front to rear; but the platform-walls at their rear ends are curved from the grain side of the machine, and above them are similarly-curved arms Q, supported by the rear ends of the gathering devices and parts below the same. These together guide the bound shocks or bundles into such position that when operated upon by the ejector they fall upon dropping devices in the rear of the main frame A. These devices consist of basket-forming rods R, fixed to a rock-shaft R', which has at its end a crank $R^2$, connected by a rod $R^3$ to hand or foot operated lever $R^4$ a little in front of the driver's seat.

Under varying conditions rows of corn or cane are placed at different distances apart, and it therefore becomes very desirable that the horses should be placed at a varying distance from the cutting devices, and hence the rear end of the tongue S, by which this machine is guided, is arranged to be thrown toward or away from the cutting devices by a crank-actuated screw S', and the tongue-brace $S^2$ is provided with a brace $S^3$ transverse to the tongue and having a series of bolt-holes allowing a corresponding lateral adjustment.

In order that the whole machine may be rocked upon its supporting-axles to throw the points of the gathering devices to or from the ground, the rear end of the tongue is attached to the frame at some distance in the rear of the front side of the latter, and upon the tongue just above said front side is mounted a ratchet-lever T, which, by means of a link T', raises or lowers this side of the frame; but to permit the lateral adjustment of the tongue just described the link is not attached directly to the frame, but to a dovetail bar T², which slides in a corresponding way T³ upon the frame's front membe

What I claim is—

1. The combination with a corn-harvester frame mounted to rock upon the axes of two supporting-wheels, of a tongue attached to the frame, means for moving the tongue bodily from side to side while so attached, and means for adjustably fixing, in all positions of the tongue, the angle made by it with the plane of the frame.

2. The combination with a suitable frame, of a binding mechanism supported by said frame and arranged for binding standing stalks, a binding-platform in position to support the stalks during such binding, and platform-supporting devices supporting the platform at heights depending upon variation in the weight that may rest upon it.

3. The combination with suitable binding devices, of a binding-platform arranged below said devices to move vertically, and springs arranged to afford yielding resistance to the depression of the platform.

4. In a corn-harvester, the combination with a binding-platform hinged at its front end to swing vertically, of devices for supporting its free rear end, a pair of endless coacting stalk-conveying chains located above the platform, and sprocket-wheels guiding the rear portions of said chains and supported from the platform to swing therewith.

5. The combination with the binder-frame, of vertically-extensible needle, knotter, packer and compressor shafts mounted therein, means for actuating said shafts, a plurality of needles mounted upon the needle-shaft, corresponding knotters mounted upon the knotter-shaft, suitable arms borne by the packer and compressor shafts, a binder-platform supported by devices permitting it to descend automatically under unusual weight of stalks, and means for equally and synchronously extending all said shafts; whereby a plurality of bands may be applied at automatically-adjusted distances from the butts of the stalks.

6. In a corn-harvester, the combination with cutting devices, of chains adjustable in height arranged to carry the butts of the stalks rearward, a vertically-adjustable platform arranged to support the stalks so carried, and protecting-walls arranged to rise and fall with said chains and platform, substantially as set forth.

7. The combination with the frame and the vertical knife-shafts, of the inclined gathering members supported from said frame and provided with central bearings for the upper ends of the knife-shafts, the gathering-chains lying within said members, the inclined shafts mounted upon said members, and gearing connecting the ends of the inclined shafts with the chain-driving shafts at their upper ends and with the knife-shafts at their lower ends, respectively.

8. In a corn-harvester, the combination with a rigid frame bearing all the guiding and primary driving mechanism, of a secondary frame detachably fixed to the first and bearing all the cutting and binding mechanism, and a drive-chain forming the sole operating connection between the two mechanisms, for the purpose set forth.

9. In a corn-harvester, the combination with two suitably-mounted parallel knife-shafts, of the knife fixed to one of said shafts and having the distinct cutting edges, a similar knife mounted upon the other shaft in position to overlap and coact with the first, and means for adjustably fixing the latter knife to the stationary support for its shaft.

In testimony whereof I affix my signature in presence of two witnesses.

DAVID F. LEISHMAN.

Witnesses:
OLOF WORM,
T. D. WEEKS.